Sept. 29, 1964   N. NEBOUT   3,151,013
MANUFACTURE OF PNEUMATIC TYRES
Filed June 18, 1962   5 Sheets-Sheet 1

Inventor:
Noel Nebout
by Benj. T. Rauber
his attorney

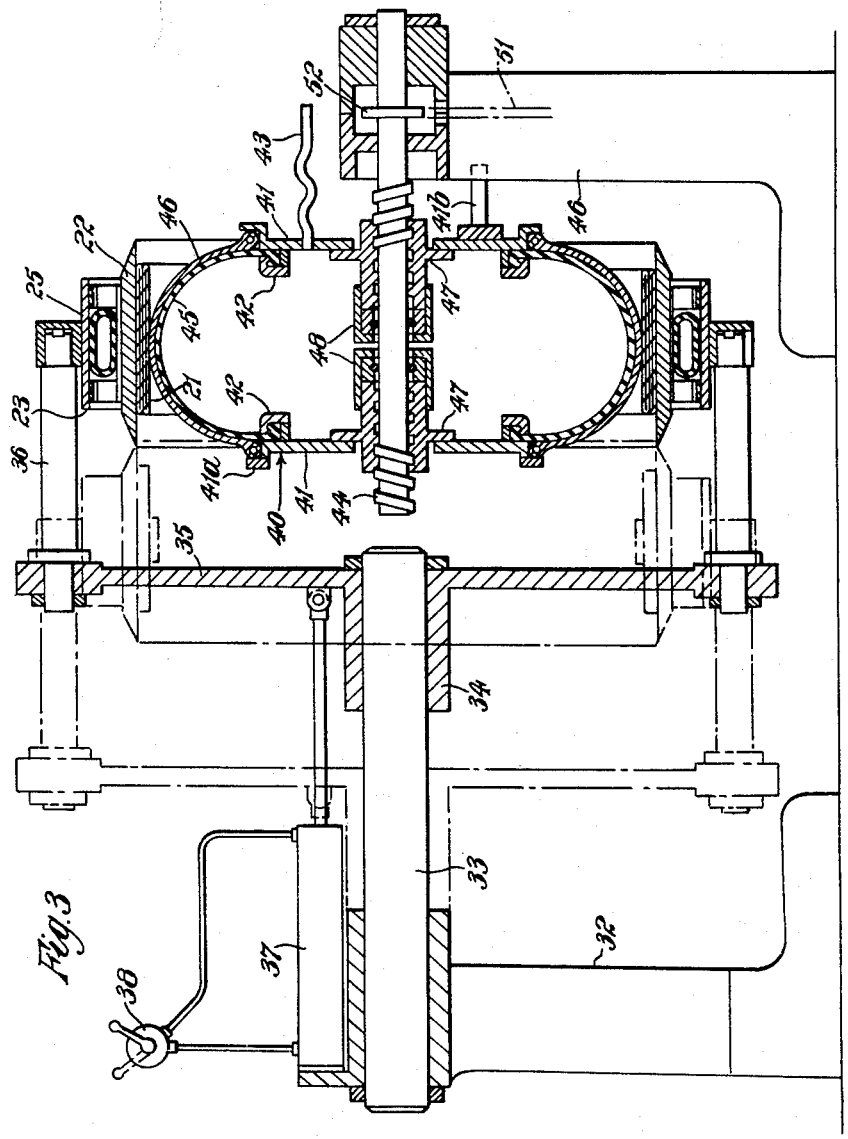

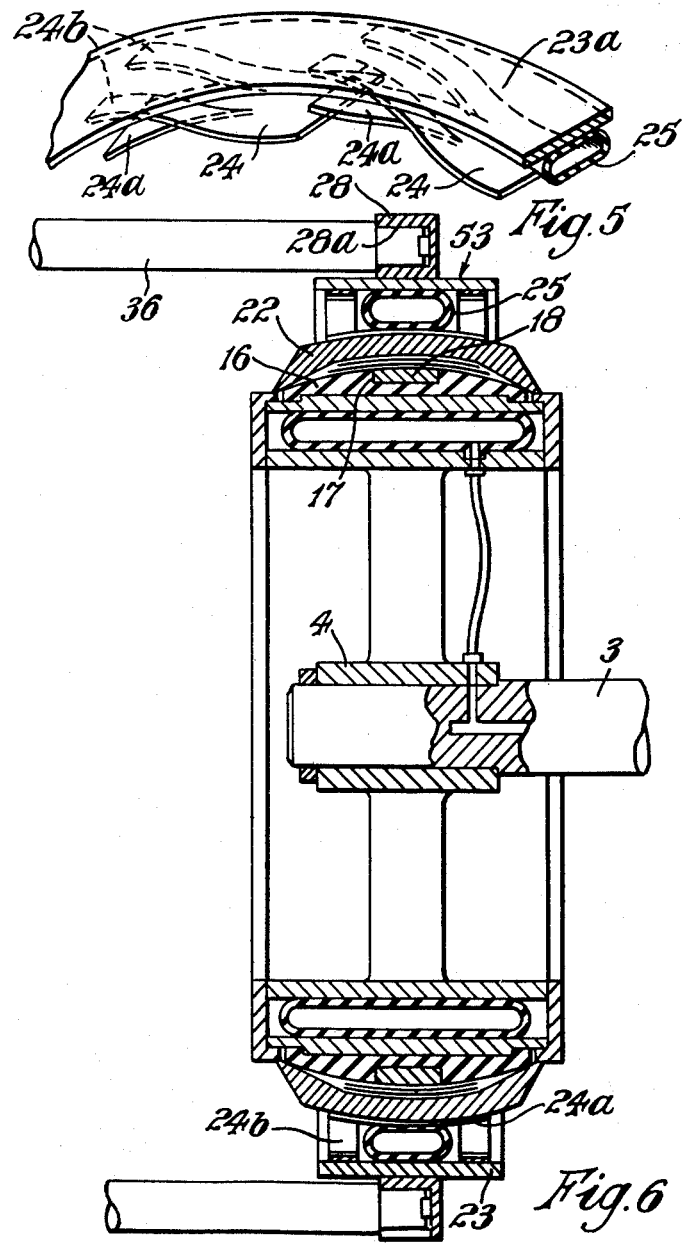

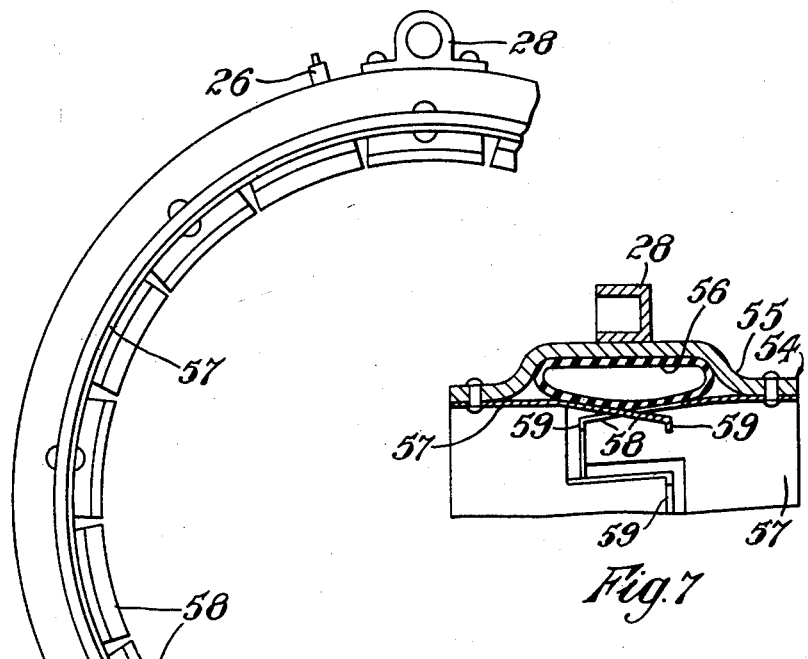
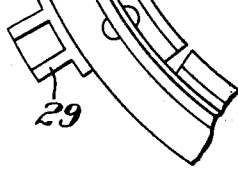
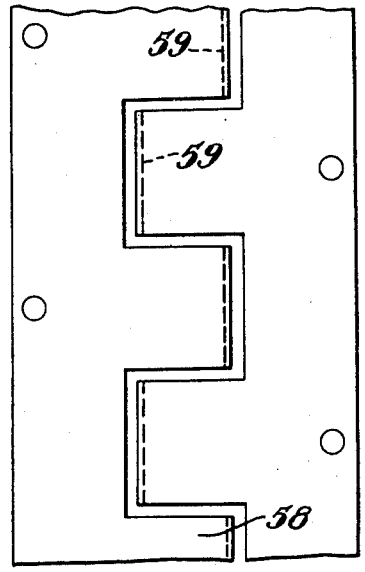

United States Patent Office 3,151,013
Patented Sept. 29, 1964

3,151,013
MANUFACTURE OF PNEUMATIC TYRES
Noel Nebout, Montlucon, France, assignor to Dunlop Rubber Company Limited, London County, England, a British company
Filed June 18, 1962, Ser. No. 204,303
14 Claims. (Cl. 156—405)

This invention relates to apparatus for assembling and shaping a pneumatic tyre.

According to the present invention, apparatus for assembling and shaping a pneumatic tyre comprises an inflatable shaping unit, for supporting and shaping a cylindrical tyre carcass, having a pair of bead supporting members and means for moving said members towards and away from one another by equal amounts in relation to the mid-circumferential plane of symmetry of the shaping unit, and a carrying means, said carrying means comprising a rigid cylindrical annulus, a plurality of spring fingers disposed in spaced relationship around the inner periphery of the annulus and an inflatable member located between at least a portion of each of the fingers and the annulus, said member being inflatable to move the fingers inwardly to grip a tread or a breaker or both, and said carrying means and shaping unit being relatively movable axially in relation to one another to move a breaker or tread or both secured within the carrying means in the form of a single annulus into a position in which the breaker or tread or both is symmetrically disposed in relation to a carcass supported by the shaping unit.

Preferably a collapsible drum is provided for supporting a tread or breaker or both and the carrying means is movable between a position in which it coaxially surrounds and is symmetrically disposed relative to a breaker or tread or both supported on the collapsible drum and a position in which it coaxially surrounds and is symmetrically positioned in relation to a carcass supported by the shaping unit.

Each of the spring fingers of the shaping unit may comprise at least one arm portion which extends in a radial outward and circumferential direction to secure its associated spring finger to the cylindrical annulus. However, the spring fingers may be formed integrally in groups, at least one group being secured at each end of the cylindrical annulus, and each spring finger of the group or groups secured at each end of the cylindrical annulus being disposed between adjacent spring fingers of the group or groups secured at the other end of the annulus.

One embodiment of the invention will now be described, by way of example, with reference to the accompanying drawings in which:

FIGURE 3 is an axial cross-sectional view showing another part of the apparatus.

FIGURE 5 is an isometric view of part of a carrying means illustrated in FIGURES 1, 2 and 3.

FIGURE 6 is an axial sectional view of a modification of part of the above apparatus;

FIGURE 7 is an axial sectional view of a further modification of the apparatus;

FIGURE 8 is an axial view of the carrying means shown in FIGURE 7;

FIGURE 9 is a view in a radially inward direction of part of the carrying means shown in FIGURE 8.

Figure 1:
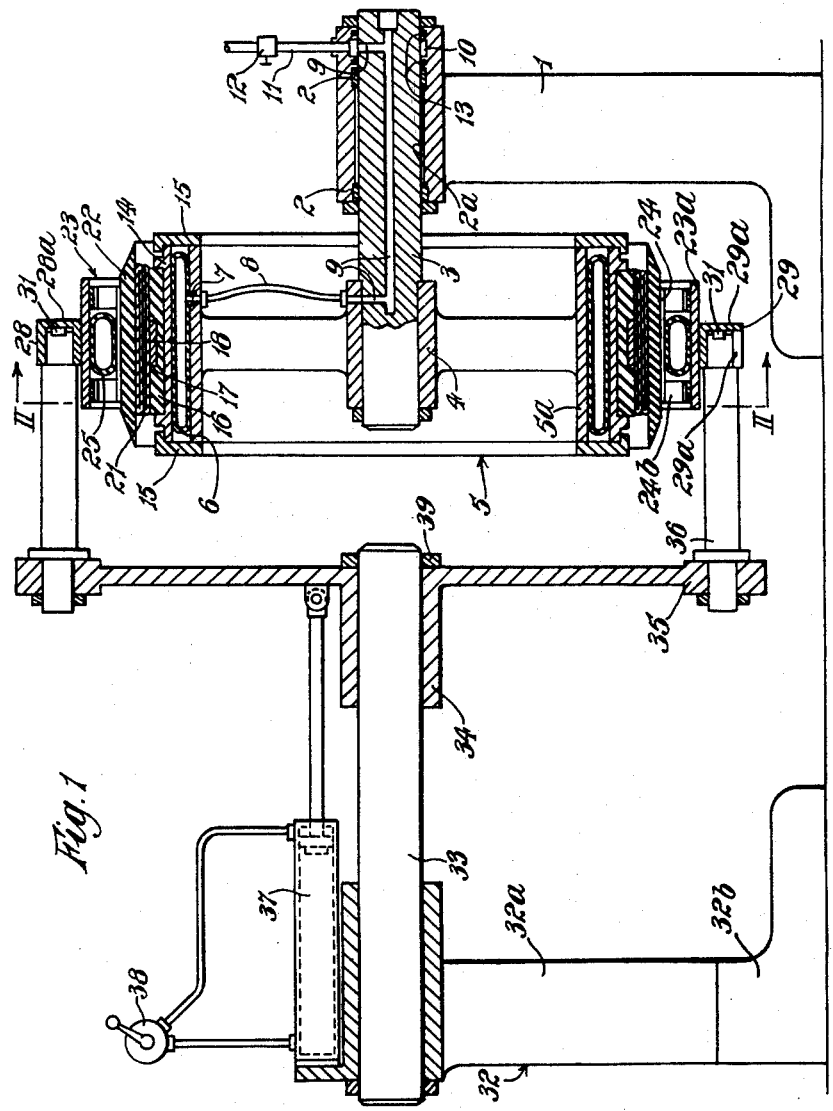
FIGURE 1 is an axial cross-sectional view of part of an apparatus according to the invention.
Figure 2:
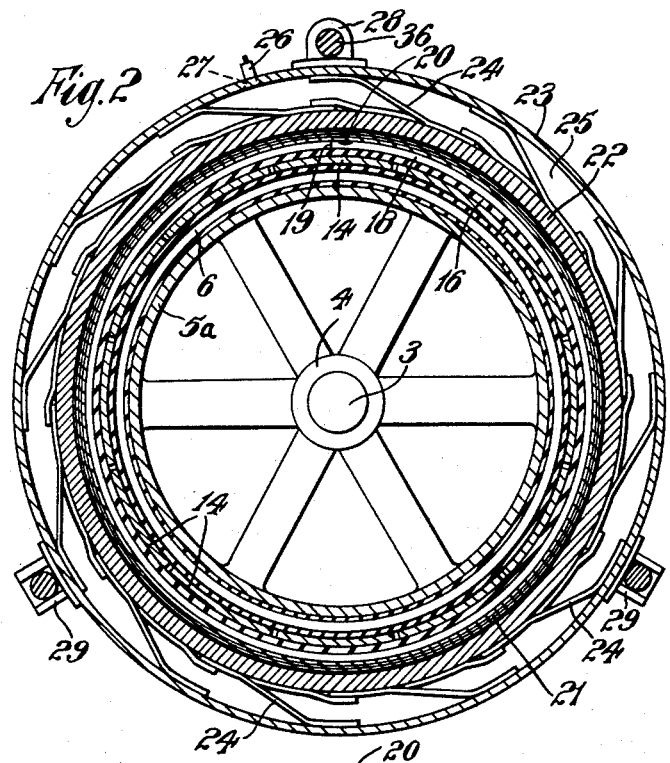
FIGURE 2 is a section on line II—II of the apparatus shown in FIGURE 1.

As shown in FIGURES 1 and 2 a tyre building apparatus comprises a collapsible rotatable drum 5, the hub 4 of which is secured to a horizontal shaft 3 rotatably mounted at one end in a pair of axially spaced bearings 2 contained within a bore 2a provided in a machine frame 1. The drum 5 comprises a cylindrical body portion 5a, a pair of side plates 15 secured one to each end of the body portion 5a to locate axially an inflatable annular bag 6 surrounded by a plurality of arcuately-shaped segments 14 which form a substantially continuous surface in the deflated state of the bag, and a thick rubber annulus 16. The bag is connected to a source of compressed air for inflating the bag or to a source of reduced pressure for deflating the bag, by pipes 7 and 8 connected to a passageway 9 which is connected to a tube 11 by an annular groove 10 provided in the machine frame. A valve 12 located on the tube is operated to inflate or deflate the bag.

Figure 4:
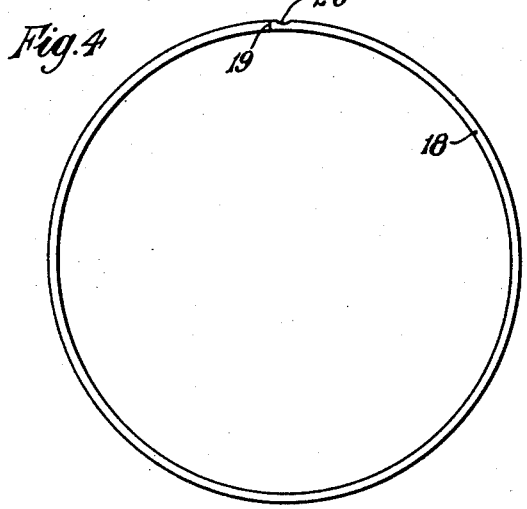
FIGURE 4 is an axial view of part of the apparatus shown in FIGURES 1 and 2.

Detachable means for supporting the inner peripheral surface of a tread or breaker is provided upon the collapsible drum. This means comprises a rigid cylindrical metal band 18 which, as shown in FIGURE 1, is received in an annular recess 17 provided in the annulus 16 when the bag 6 is in an inflated state. As shown in FIGURE 4, the band 18 has a radially extending split 19 at one part of its circumference and a notch 20 provided on its outer peripheral surface for a purpose to be later described.

A carrying means 23 for removing a tread or breaker or both from the drum 5 and for positioning the tread or breaker or both upon a carcass as will later be described, comprises a rigid cylindrical annulus 23a disposed around the inner peripheral surface of which is an inflatable cylindrical diaphragm 25. The diaphragm is inflatable through a valve 26 extending through an opening 27 in the annulus 23a (see FIGURE 2). A plurality of spring fingers 24 are located in spaced-apart relationship within the annulus 23a (see particularly FIGURES 2 and 5), the fingers each comprising an arcuately-shaped gripping portion 24a which is disposed on the inner peripheral surface of the diaphragm 25, and two parallel arm portions 24b which are formed integrally with the gripping portion and extend in a radially outwardly and circumferential direction, being secured at their radially outer ends to the annulus 23a. The gripping portions 24a form a segmented annulus within the carrying means, each portion 24a overlapping and being circumferentially slidable relative to its adjacent portions 24a. Two lugs 29 (see FIGURE 2) and a lug 28 are secured in equally spaced-apart positions to the outer peripheral surface of the annulus 23a, three pins 36 received within the lugs securing the carrying means to a disc 35 forming part of a mounting means 32 for the carrying means. The pins 36 are held within the lugs by permanent magnets 31 which are located between the ends of the pins and end plates 28a and 29a of the lugs. A sleeve 34 is coaxially and integrally formed with the disc 35, the sleeve 34 being slidably mounted upon a shaft 33 secured at one end to a vertical member 32a of the mounting means, the member 32a being rotatably mounted upon a base 32b for pivoting the carrying means between a position in which it is coaxial with the cylindrical drum 5 and a position in which it is coaxial with a shaping unit shortly to be described.

A double-acting pneumatic cylinder and piston 37 operable by a two-way valve 38 and mounted on the upper portion of the vertical member 32a, is connected by the end of the piston rod to the disc 35 for moving the carrying unit axially along the shaft 33. Means is provided for locating the carrying unit symmetrically with respect to the mid-circumferential plane of a tread or breaker or both positioned on the drum 5 or, as will be described, for locating a tread or breaker or both carried by the carrying unit symmetrically with respect to the mid-circumferential plane of a tyre carcass. This means comprises a stop ring 39 for the disc 35, the ring being secured to the shaft 33.

As shown in FIGURE 3, a shaping unit 40 for shaping a pre-built tyre carcass into a cylindrical shape comprises a pair of coaxial disc-shaped bead supporting members 41 between which extends an inflatable cylindrical diaphragm 45, the diaphragm being fixed by its ends to the members 41 by flanged rings 42. One of the members 41 is provided with a detachable bead-retaining flange 41a to allow for the positioning upon and removal from the shaping unit of a tyre carcass. The diaphragm is inflatable by means of a tube 43 which connects the chamber contained between the members 41 and the diaphragm with a source of fluid pressure. Means are provided for moving the bead supporting members towards and away from one another symmetrically with respect to the mid-circumferential plane of the shaping unit. This means comprises a shaft 44 rotatably mounted at one end in a machine frame 46, the shaft having right-hand and a left-hand screw-threaded portions, which are received in complementary screw-threaded nuts 47 coaxially mounted on the members 40. Fluid-tight sealing means 48 is provided on the axially inner end of each of the nuts 47 to prevent the escape of air under pressure during inflation of the diaphragm 45. The shaft 44 is rotatable to effect movement of the members 40 through an endless chain 51 (part of which is shown) and sprocket 52 by means of an electric motor and reduction gearbox (both not shown). One of the members 41 is provided with an axially extending shaft 41b which is slidably received in a hole provided in the frame 46 to prevent rotation of the members 41.

The use of the apparatus will now be described.

A breaker 21 and tread layer 22 are located around the cylindrical drum 5 in the expanded state of the diaphragm 6 as shown in FIGURE 1. The carrying means 23 is then positioned around the tread and breaker assembly with the diaphragm 25 in the uninflated state. When the carrying means is symmetrically positioned with respect to the midcircumferential plane of the tread and breaker assembly, i.e. when the disc 35 is in engagement with the ring 39, the diaphragm 25 is inflated. Inflation of the diaphragm causes radially inward movement of the arcuately-shaped gripping portions 24a of the spring fingers to grip the outer peripheral surface of the tread and breaker assembly, this inward movement causing the flexing of the portions 24b of the spring fingers. The diaphragm 6 is then deflated to collapse the drum 5, but the metal band 18 remains in position on the inner peripheral surface of the tread and breaker assembly to support the assembly.

The carrying means is removed axially from the drum 5, by actuation of the pneumatic cylinder and piston 37, and rotated upon the base 32b into a position coaxial with the shaping unit 40 upon which a carcass in its cylindrically built condition has been positioned. The metal band 18 is removed from within the tread and breaker assembly by inserting a suitable tool within the notch 20 to move the notched end radially inwardly and so contract the ring. The carrying means is then moved into a position which the tread and breaker assembly coaxially surrounds the carcass and is symmetrically positioned relative to the mid-circumferential plane of the carcass. Inflation of the diaphragm 45 then takes place simultaneously with rotation of the shaft 44 to draw the bead supporting members towards each other to form the carcass into a toroidal shape and bring the carcass into engagement with the tread and breaker assembly.

The diaphragm 25 is deflated allowing the portions 24b of the spring fingers to return to their unflexed positions and to allow the carrying means to be removed. The tyre may then be completed in a normal manner.

In a modification (see FIGURE 6) to the apparatus described above, a carrying means 53 is of similar construction to the carrying means 23, but in this case the arcuately-shaped gripping portions 24a of the spring fingers are also arcuately-shaped in axial cross-section for gripping a partially formed tread and breaker assembly mounted on the cylindrical drum. To partially form the tread and breaker assembly, the annulus 16 of the drum 5 is of convex curvature in an axial direction upon its outer peripheral surface.

In a further modification shown in FIGURES 7, 8 and 9 a carrying means 54 comprises a rigid annulus 55 contained within which is an inflatable cylindrical diaphragm 56. Two annular springs 57 are secured, each by one end, to the ends of the annulus 55, each spring comprising at its other end a plurality of spaced-apart arcuately-shaped spring fingers 58, the fingers 58 of each spring being positioned between adjacent fingers of the other spring and in engagement with the inner peripheral surface of the diaphragm 56. All the spring fingers 58 form an annulus within the carrying means, and each spring finger is secured at one end in cantilever fashion to the annulus. Each spring finger comprises at its free end a radially inwardly extending gripping flange 59. In the use of the carrying means 54, the diaphragm is inflated which causes the free ends of the spring fingers 58 to move radially inwardly thus flexing the fingers. During this inward movement, the flanges 59 grip the outer peripheral surface of a tread and breaker assembly to be removed from the cylindrical drum. To remove the tread and breaker assembly from the carrying means the diaphragm is deflected allowing the spring fingers to return to their unflexed conditions so that the grip of the flanges 58 upon the assembly is released.

Having now described my invention, what I claim is:

1. Apparatus for assembling and shaping a pneumatic tyre comprising an inflatable shaping unit, for supporting and shaping a cylindrical tyre carcass having a pair of bead supporting members and means for moving said members towards and away from one another symmetrically in relation to the mid-circumferential plane of the shaping unit, and a carrying means, said carrying means comprising a rigid cylindrical annulus, a plurality of spring fingers disposed in spaced relationship around the inner periphery of the annulus and an inflatable member located between at least a portion of each of the fingers and the annulus, said member being inflatable to move the fingers inwardly to grip a tread or a breaker or both, and said carrying means and shaping unit being relatively movable axially in relation to one another to move a breaker or tread or both secured within the carrying means in the form of a single annulus, into a position in which the breaker or tread or both is symmetrically disposed in relation to a carcass supported by the shaping unit.

2. Apparatus according to claim 1 wherein a collapsible drum is provided for supporting a breaker or a tread or both, said carrying means being movable between a position in which it coaxially surrounds and is symmetrically disposed relative to a breaker or a tread or both supported upon the collapsible drum and a position in which it coaxially surrounds and is symmetrically positioned in relation to a carcass supported by the shaping unit, means being provided for either locating the carrying means relative to the mid-circumferential plane of a breaker or tread or both positioned on the drum or alternatively for locating a tread or breaker or both carried in the carrying means symmetrically with respect to the mid-circumferential plane of a tyre carcass.

3. Apparatus according to claim 1 wherein each of the spring fingers comprises at least one arm portion which is secured at one end to the rigid cylindrical annulus and is provided at its other end with an arcuately-shaped portion, the inflatable member being disposed between the arcuately-shaped portions of the spring fingers and the cylindrical annulus.

4. Apparatus according to claim 1 wherein the spring fingers are formed integrally in groups, at least one group being secured to each end of the cylindrical annulus and each spring finger of the group or groups secured at each end of the cylindrical annulus being disposed between adjacent spring fingers of the group or groups secured at the other end of the annulus.

5. Apparatus according to claim 4 wherein each spring finger is provided at its end remote from its end secured to the cylindrical annulus with a radially inwardly extending flange portion for gripping a tread or breaker or both located within the carrying means.

6. Apparatus according to claim 2 wherein the carrying means is axially movable upon a mounting means which is pivotally mounted about an axis normal to the axis of the carrying means for pivoting the carrying means between a position in which it is coaxial with the cylindrical drum and a position in which it is coaxial with the shaping unit.

7. Apparatus for assembling and shaping a pneumatic tyre comprising an inflatable shaping unit, for supporting and shaping a cylindrical tyre carcass, said unit having a pair of bead supporting members and means operably connected to said members for moving said members towards and away from one another symmetrically in relation to the mid-circumferential plane of the shaping unit, a carrying means, said carrying means comprising a rigid cylindrical annulus, a plurality of spring fingers disposed in spaced relationship around the inner periphery of the annulus and an inflatable member located between at least a portion of each of the fingers and the annulus, said inflatable member being inflatable to move the fingers inwardly to grip a tread and breaker, and a collapsible drum for supporting a tread and breaker, said collapsible drum being spaced from the shaping unit and comprising detachable supporting means upon the drum for supporting the inner peripheral surface of a tread and breaker after removal of the tread and breaker from the collapsible drum, said carrying means being movable between a position in which it coaxially surrounds and is symmetrically disposed relative to a breaker and tread supported upon the collapsible drum and a position in which it coaxially surrounds and is symmetrically positioned in relation to a carcass supported by the shaping unit, positioning means being provided for locating the carrying means relative to the mid-circumferential plane of a breaker and tread positioned on the collapsible drum and for locating the tread and breaker carried in the carrying means symmetrically with respect to the mid-circumferential plane of a tyre carcass supported by the shaping unit.

8. Apparatus according to claim 7 wherein the detachable supporting means comprises a band of metal which is formed into a substantially circular shape with the ends of the band located adjacent to one another and which is detachably mounted in an annular recess provided in the outer peripheral surface of the collapsible drum.

9. Apparatus for supporting tread elements of a pneumatic tyre carcass in passage from one position to another which comprises a rigid annulus, an annular inflatable tube mounted on the inner periphery of said annulus and spring fingers mounted on the inner periphery of said annulus in a circumferential series, said spring fingers having portions extending in contact with the inner periphery of said inflatable tube to be deflected radially inwardly by the inflatable tube upon inflation to engage and hold said tread elements.

10. The apparatus of claim 9 in which each of said spring fingers comprises two parallel arm portions secured to the rigid annulus on opposite sides of said inflatable tube and a gripping portion between said arm portions adjacent to the inner surface of said inflatable tube to form a segmented annulus to engage the outer surface of an assembly of tread elements upon inflation of said inflatable tube.

11. The apparatus of claim 10 in which the gripping portions forming the segmented annulus are arcuately shaped.

12. The apparatus of claim 9 in which alternate spring fingers of said series are secured to said rigid annulus on opposite sides of said inflatable tube and extend over the radially inner surface of said inflatable tube.

13. The apparatus of claim 12 in which said fingers cross each other to the side opposite the side at which they attach to said annulus and have radial flanges to engage the sides of a tread assembly encircled by said annulus.

14. The apparatus of claim 9 having a split ring to engage the inner surface of tread elements mounted in said annulus, said spring ring being collapsible to release said tread elements.

References Cited in the file of this patent
UNITED STATES PATENTS

| | | |
|---|---|---|
| 1,455,260 | Midgley | May 15, 1923 |
| 1,643,202 | Denmire | Sept. 20, 1927 |
| 2,814,330 | Vanzo et al. | Nov. 26, 1957 |
| 2,943,668 | Trevaskis et al. | July 5, 1960 |
| 2,986,196 | Frazier | May 30, 1961 |
| 3,063,491 | Mitchell | Nov. 13, 1962 |
| 3,070,478 | Riddle | Dec. 25, 1962 |

FOREIGN PATENTS

| | | |
|---|---|---|
| 233,579 | Australia | July 30, 1959 |
| 628,631 | Canada | Oct. 3, 1961 |
| 1,243,790 | France | Sept. 5, 1960 |